MAGNETIC TRANSDUCER WITH SINGLE PIECE CORE

Filed March 19, 1962 2 Sheets-Sheet 1

*INVENTORS*
EDGAR A. BROWN
GUNTER H. SCHACHT
*BY*
Otto Schmid, Jr.
AGENT 3,341,667
Patented Sept. 12, 1967

3,341,667

MAGNETIC TRANSDUCER WITH SINGLE PIECE CORE

Edgar Alan Brown, Gilroy, and Gunter Heinz Schacht, San Jose, Calif., assignors to International Business Machines Corporation, New York, N.Y., a corporation of New York Filed Mar. 19, 1962, Ser. No. 180,746
4 Claims. (Cl. 179—100.2)

ABSTRACT OF THE DISCLOSURE

This invention relates to a low mass magnetic transducer particularly suited for use in contact recording. To maintain a high recording density it is desired to maintain the transducer gap uniform over its height so that the gap will not change as the transducer is worn due to the contact with the record member. This objective is accomplished by fabricating the magnetic core from a single piece of magnetic material formed so that one of the pole pieces extends perpendicularly to the direction of movement of the transducer and the other pole piece comprises a pair of spaced pole pieces extending parallel to the direction of movement of the transducer.

The invention relates to magnetic transducing heads and more particularly to a high recording density, extremely low mass magnetic transducing head and methods for making the same.

Since both the reading and writing efficiencies of a magnetic transducer are significantly reduced as the distance between the transducer and a record member is increased it follows that the best performance, all other things being equal, will be obtained when the head operates in contact with the record member.

To keep the head in contact with a moving record member, the head must be forceably urged toward the record member, and such forces that exist between the transducer and the record member may cause wear of the transducer. Additionally, moving record members such as disks and drums have measurable runout, and therefore additional force is required to provide the accelerating force needed to maintain contact while running, thus further increasing the wear problem. Generally speaking, the accelerating forces are most significant. This additional accelerating force can be kept to a minimum, for a given runout characteristic, by constructing a transducer of extremely low mass. In the past, in order to achieve low mass, minimum ferromagnetic material has been employed leading to the "tear drop" type of construction. The "tear drop" design is suitable for high density recording when a minimum length gap is achieved. However, as the pole tips of a tear drop head are worn, due to running in contact with a record member, for example, the gap length increases and hence the high density recording capability is reduced. Efforts have been made to correct this shortcoming, but these efforts have not produced a transducer with the desired characteristics which can be easily manufactured.

It is, therefore, an object of the present invention to provide an improved magnetic transducer suitable for use in high density contact recording.

It is a further object of this invention to produce a very low mass transducer suitable for contact recording.

It is an additional object of the invention to provide a transducer capable of high density recording having a minimum amount of electrical conducting and magnetic materials.

An important feature of the invention is the provision of a relatively high transducer gap which is maintained at a constant length over its height so that the characteristics of the transducer gap will not be changed as the transducer is worn due to contact with the moving record member.

If a "tear drop"-type head is modified so as to provide sufficient height of the gap that wear will not deteriorate the high density performance, then it is found that the relative reluctance of the gap is so reduced that the "writing" characteristics are greatly degenerated. Therefore, to provide a transducer that will be a good writing transducer and also a good reading transducer at high densities, the magnetic path of the transducer of the invention is so arranged that one pole piece is essentially perpendicular to the other pole piece at the gap. The resulting relative reluctance of the gap with respect to the entire magnetic path is high and results in a major portion of the "writing" MMF appearing across the gap and thus produces the desired magnetization of the record member; this arrangement also provides a good read head.

Therefore, it is another object of the invention to produce a transducer suitable for both reading and writing at high recording densities.

It is a more particular object of the invention to provide a transducer having a relatively high transducer gap uniformly spaced over its height which is suitable for both reading and writing at high densities.

Existing transducers made of one or more laminations of ferromagnetic material require that the pole tips at the gap of each lamination be accurately coplanar and square. Since these laminations are generally very thin, it is difficult to obtain a uniform length over the height of the gap and to achieve the coplanar and square configuration at the pole tips. In this invention, the arrangement of one pole tip turned essentially perpendicular to and considerably wider than the other pole tip at the gap eliminates the need for coplanar accuracy, and the flexibility of the turned pole tip, allowing it to conform readily to the other pole tip, requires squareness of only the other pole tip. Likewise, this arrangement permits simple achievement of the requirement for a uniform gap since a non-magnetic spacer may be used to set the transducer gap, thereby obtaining a gap length as uniform as the non-magnetic spacer.

It is, therefore, a further object of this invention to provide an improved method of making magnetic transducers so that their characteristics are substantially the same.

It is still a further object of this invention to provide an improved method of making magnetic transducers with a minimum of skill at low cost.

A significant reduction in read back signal results when conventional transducers are shifted laterally from the nominal track position. Extensive and expensive accessing mechanisms are required to keep the error to a tolerable value where the head is moved from a first track position to a second track position. In this invention, one pole tip is made the equivalent of two magnetically separated laminations. This results in a head that performs as well as a head made of two laminations and at the same time permits a greater lateral misalignment for a similar set of requirements. Thus, the cost and complexity of the accessing mechanisms may be correspondingly reduced. In addition, in this invention, with one of the pole tips arranged peripendicular to and wider than the other pole tip, the perpendicular pole tip will be wider than the recorded track and therefore may fully straddle the recorded track even when the other pole tip does not, due to a misalignment as discussed above.

It is, therefore, a further object of this invention to provide a magnetic transducing head made of a single piece of magnetic material that will have performance equal to or better than an equivalent transducer made of at least two pieces of magnetic material.

It is a still further object of this invention to provide a magnetic transducer that will allow considerable lateral misalignment from a nominal track position.

The present invention provides a low mass magnetic transducer particularly suitable for use in contact recording in which the magnetic flux path is formed from a single piece of magnetic material to ensure a low reluctance flux path, a relatively high transducing gap uniform over its length, with one pole of the magnetic flux path arranged substantially perpendicular to the other pole so that the transducer is suitable for both reading and writing coded information at high densities in conjunction with a record member.

Other objects, features, and advantages of the invention will be pointed out in the following description and claims and illustrated in the accompanying drawings which disclose, by way of example, the principle of the invention and the best mode which has been contemplated of applying that principle.

Figure 9A:
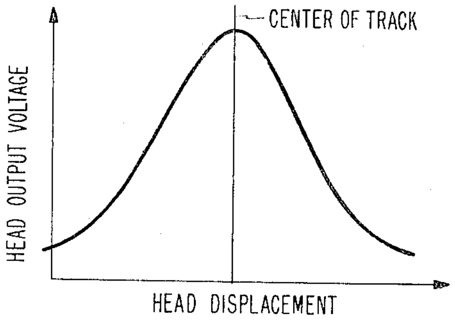

FIG. 9*a* is an envelope of read back voltages resulting from reading a track of coded information as a conventional transducer is moved transversely across the track.

Figure 3:
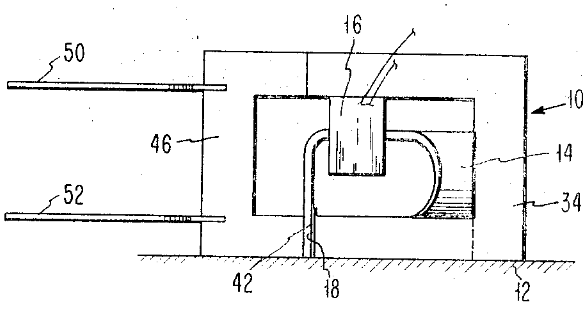
FIG. 3 is a side view of a magnetic transducer in accordance with another embodiment of the invention.
Figure 9B:
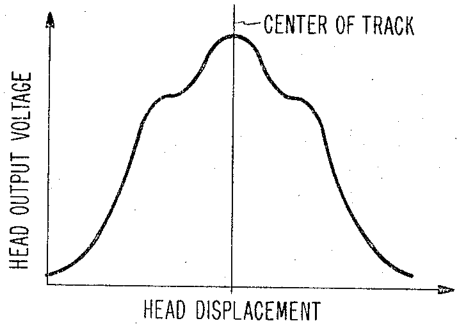

FIG. 9*b* is an envelope of read back voltages resulting from reading a track of coded information as the transducer of FIG. 3 is moved transversely across the track.

Referring to the drawings, and particularly to FIG. 3, the magnetic transducer 10 is shown in recording relationship with a record member 12. The magnetic transducer comprises a closed magnetic circuit 14 about which is mounted a winding 16. The magnetic circuit comprises core member 14, the ends of which are separated by a non-magnetic gap 18. When the winding 16 is energized, by means not shown, flux is caused to flow around the magnetic circuit and produces a writing force across the gap 18 adjacent to the record member 12. If a reading operation is desired, the winding 16 is de-energized in which case the remanent flux from the moving record member 12 changes the magnetization in the core 14 thereby generating a signal in the winding 16.

Figure 1:
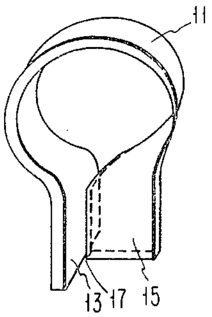
FIG. 1 is a perspective view of a core structure showing a magnetic flux path according to one embodiment of the invention.
Figure 2:
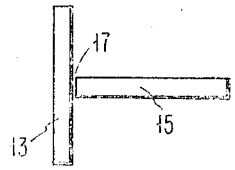
FIG. 2 is a schematic bottom view of FIG. 1.
Figure 5:
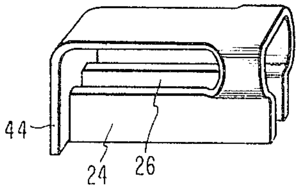
FIG. 5 is a perspective view of the magnetic material of FIG. 4 when shaped to construct the magnetic transducer.
Figure 6:
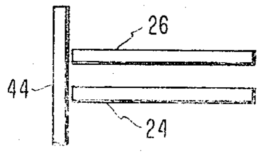
FIG. 6 is a schematic bottom view of FIG. 5.

It is an important feature of the invention that the magnetic core be constructed of a single piece of magnetic material as shown in FIG. 1 or 5. This is necessary since in very high density recording the magnetic gap is very minute, such as less than 125 micro inches, and the mass of the head must be kept low to avoid the effects of signal amplitude variations due to changes in clearance between the transducer and the record member. Thus, the low reluctance required to obtain a highly efficient transducer meeting these requirements can be obtained only by using a continuous piece of magnetic material for the magnetic core. A magnetic core 11 constructed of a single piece of magnetic material is shown in FIG. 1. This core has one pole piece 13 turned relative to the other pole piece 15. This structure provides a reluctance at the gap 17 that is high relative to the entire magnetic path so that an efficient writing structure is produced and additionally provides a high gap that is uniform over its height.

Figure 4:
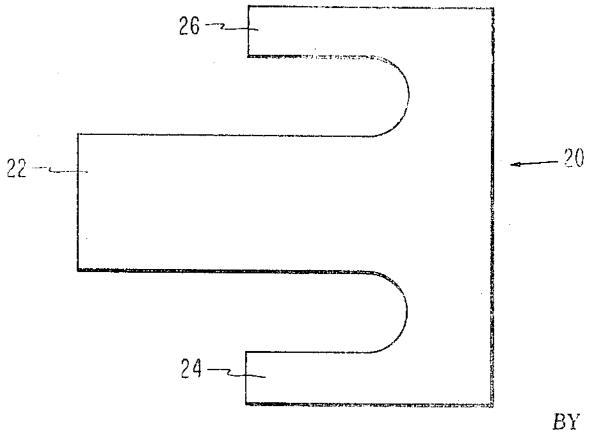
FIG. 4 is a view of the single piece of magnetic material used in making the magnetic transducer shown in FIG. 3.
Figures 7, 8:
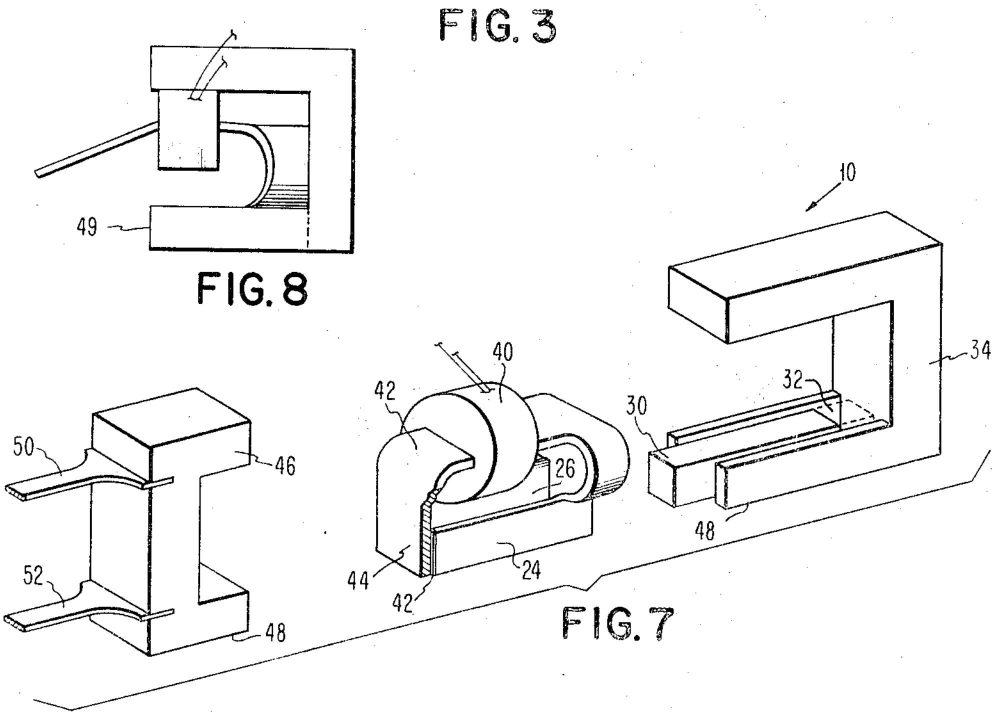
FIG. 7 is an exploded view of the apparatus shown in FIG. 3.
FIG. 8 is a view showing the assembly of the core member and one part of the housing member at the time of machining one pole face.

Referring now to the apparatus in FIG. 7, an exploded view of the magnetic transducer is shown to illustrate its construction more clearly. The magnetic core is made from a single piece of magnetic permeable material 20 as shown in FIG. 4. Commercially available magnetic sheet materials, such as those known under the trademarks "Mu-Metal," "High Mu 80," "78 Permaloy" and "Alfenol" which have high permeability and low coercivity, are suitable for forming the magnetic cores of the transducer. The core material has three tongue portions extending in the same direction. The middle tongue portion 22 is longer than the two outside portions 24, 26 since the middle tongue 22 forms one pole piece of the transducer when bent to a position adjacent the two outside portions as shown in FIG. 5. The sheet material is formed by bending the two side tongues 24, 26 so that they are substantially parallel to each other and separated along their length by a desired amount. Once the magnetic material is shaped, as shown in FIG. 5, the material may then be annealed to remove the stresses due to forming the material. One of the disadvantages of prior art transducers in which the magnetic core has been constructed of a single piece of magnetic material has been the decreased permeability and increased coercivity resulting from the mechanical stress incident to the final assembly of these transducers.

The separation of the tongue portions 24, 26 can best be accomplished by using a non-magnetic shim 30 (FIG. 7) whose thickness is equal to the desired spacing. The ends of tongue portions 24, 26 and the shim 30 are then secured in a slot 32 of a housing member 34. The housing member 34 comprises a substantially C-shaped member of a suitable non-magnetic material such as nylon, for example. The core material may be secured in the slot in the housing member by any suitable means, such as a cement of the poly cyano alkyl acrylate type sold under the trade name of "Eastman 910" by Eastman Kodak Company. When the core material has been secured in the slot, FIG. 8, the ends of tongues 24, 26, shim 30, and the housing member forming surface 49 can then be machined to the desired shape and finish since one side of the gap is formed thereby. A preformed coil 40 is then placed over the central tongue portion 22 and the end 44 of this central tongue portion is then bent down adjacent the finished surface 49 of the side tongue members of the core so that a gap of a predetermined length will be formed therebetween. The gap may be maintained by any suitable non-magnetic material; and, in view of the minute gaps required for high density recording, it has been found desirable to maintain this gap by means of an insert 42 of non-magnetic material or by plating a non-magnetic material on the abutting surface of tongue 22. The insert 42 is placed adjacent the end portions of the core; and, when tongue portion 22 is bent down, the non-magnetic material thus sets the length of the magnetic gap. Sufficient pressure is used in forcing the end 44 of the central tongue portion 22 against the spacer 42 to cause the spacer 42 and the end 44 to conform to the shape of the previously machined surface 49 of the end portions of the core and the housing member. Thus it can be seen that the air gap is maintained at a uniform length over its height since the gap length is as uniform as the thickness of the insert used. Non-magnetic metals and also plastic materials may be used for the spacer, but gold is a preferred material due to its high conductivity producing eddy-current effects at high frequencies. The eddy-current effect in the gold, at high frequencies, tends to serve as a shield, increasing the reluctance of the gap without increasing the gap length. The tongue portion 22 of the core is held in position to maintain the gap at its predetermined length. This may be accomplished by any suitable means such as the use of a plastic cement which will keep tension on the tongue member and thereby maintain the gap spacing uniform. It has been found that a more desirable way of fastening the end 44 in place is to use the same material that is used in the housing member and complete a housing around the transducer which will serve to protect it from mechanical jars and also provide a means for mounting the transducer. This is accomplished by attaching a second C-shaped housing member 46 to the housing member 34 by the use of the same cement used to attach the core member to the nylon housing member 34 thereby keeping tension on the tongue portion of the core and maintaining the gap at a fixed length. Mounting members 50, 52 may be attached to the housing member 46 to mount the transducer adjacent the record member. The mounting members are preferably flat springs of sufficient force to enable the transducer to follow any runout in the magnetic record member. It is then necessary to machine away the excess material of the lower surface 48 of the housing members so that the pole face will be exposed at the surface of the housing member as shown in FIG. *4a*.

A typical signal read from a track of coded information by a conventional head is shown in FIG. *9a*. However, it is desirable to use the type of core construction shown in FIG. 5 in which case a typical read signal would be similar to that shown in FIG. *9b*. The disposition of the tongues 24 and 26 forming one pole piece in parallel spaced apart position, is approximately equivalent to two separate reading transducers. Thus, the spacing apart of the tongues has the effect of producing two separate read signals which are additive in the coil to form the envelope shown in FIG. *9b*.

Thus, it can be seen that a magnetic transducer has been provided which is suitable for high density contact recording, due to a relatively high parallel air gap whose length will remain constant as the transducer is worn due to the contact with the record medium. While high air gaps are not efficient to write structures, the disposing of one pole face substantially transverse to the record track direction provides, on energization, the necessary amount of magneto motive force at the pole tips to write upon the magnetic record. The disposition of the other pole piece, consisting of two parallel spaced members, produces a superior track profile so that a transducer would have to be less accurately placed in relation to a previously recorded track since a reading at a specified tolerance away from the nominal position of the track will still produce a usable read signal, whereas with a conventional head of the same width a usable signal would not be obtained with the same maximum allowed degree at misalignment. Thus, the use of the transducer of the subject invention permits wider variations in head/track location caused by temperature variations, replacing either the magnetic record or a particular head, or other reasons.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A transducer for association with a single information track on a magnetic record comprising:

a core formed from a single continuous piece of magnetic material having first and second closely spaced pole pieces separated by a non-magnetic gap across which said magnetic record is arranged to pass in a predetermined direction, said first pole piece extending substantially transverse to said predetermined direction, said second pole piece extending substantially parallel to said predetermined direction, said second pole piece comprising spaced portions of said magnetic permeable material in planes substantially perpendicular to the plane of the record, and means positioned on said core member between said first and second pole pieces for establishing a magnetic flux which extends into said record along said single information track adjacent said non-magnetic gap.

2. A transducer for association with a single information track on a magnetic record comprising:

a core formed from a single continuous piece of magnetic material having first and second closely spaced pole pieces separated by a non-magnetic gap across which said magnetic record is arranged to pass in a predetermined direction, said first pole piece extending substantially transverse to said predetermined direction, said second pole piece extending substantially parallel to said predetermined direction, said second pole piece comprising spaced portions of said magnetic permeable material in planes substantially perpendicular to the plane of the record, and a sensing winding positioned on said core member between said first and second pole pieces and operable to provide a read signal in accordance with a change in magnetization of the core member caused by remanent flux of said single information track.

3. A magnetic transducer for association with a single information track on a magnetic record movable relative to said transducer in a predetermined direction comprising;

a core member shaped from a single piece of magnetic permeable material to form a magnetic flux circuit broken by a non-magnetic gap, said core member comprising a first pole piece substantially perpendicular to said predetermined direction and a second pole piece comprising spaced leg portions in planes disposed substantially parallel to said predetermined direction and substantially perpendicular to the plane of the record, said first pole piece disposed adjacent said second pole piece of said core member to define said non-magnetic gap therebetween, and a winding disposed on said core member between said first and second pole pieces for causing a flow of flux around said magnetic circuit to magnetically affect that portion of said single information track adjacent said non-magnetic gap.

4. A magnetic transducer for association with a single information track on a magnetic record movable relative to said transducer in a predetermined direction comprising:

a core member shaped from a single piece of magnetic permeable material to form a magnetic flux circuit broken by a non-magnetic gap, said core member comprising a first pole piece disposed substantially perpendicular to said predetermined direction and a second pole piece comprising spaced leg portions in planes disposed substantially parallel to said predetermined direction and substantially perpendicular to the plane of the record, said first pole piece disposed adjacent said second pole piece of said core member to define said non-magnetic gap therebetween, and a winding disposed on said core member between said first and second pole pieces and operable to provide a read signal in accordance with a change in magnetization of the core member caused by remanent flux of said single information track.

References Cited

UNITED STATES PATENTS

| | | | |
|---|---|---|---|
| 2,676,392 | 4/1954 | Buhrendorf | 29—155.58 |
| 2,677,019 | 4/1954 | Buhrendorf | 179—100.2 |
| 2,785,038 | 3/1957 | Ferber | 179—100.2 |
| 2,987,582 | 6/1961 | Naiman | 179—100.2 |

FOREIGN PATENTS 889,793 2/1962 Great Britain.

OTHER REFERENCES

IBM Technical Disclosure Bulletin, vol. 3, No. 11, April 1961.

BERNARD KONICK, *Primary Examiner.*

J. R. GOUDEAU, *Assistant Examiner.*